United States Patent
Vattaneo et al.

(10) Patent No.: US 7,140,336 B2
(45) Date of Patent: Nov. 28, 2006

(54) INTERNAL COMBUSTION ENGINE WITH VALVES WITH VARIABLE ACTUATION WHICH ARE DRIVEN BY A SINGLE PUMPING PISTON AND CONTROLLED BY A SINGLE SOLENOID VALVE FOR EACH ENGINE CYLINDER

(75) Inventors: Francesco Vattaneo, Pancalieri (IT); Damiano Micelli, Orbassano (IT); Costantinos Vafidis, Orbassano (IT); Roberto Saretto, Orbassano (IT)

(73) Assignee: C.R.F. Societa Consortile per Azioni, Orbassam (IT)

( * ) Notice: Subject to any disclaimer, the term of this patent is extended or adjusted under 35 U.S.C. 154(b) by 0 days.

(21) Appl. No.: 11/272,087

(22) Filed: Nov. 14, 2005

(65) Prior Publication Data

US 2006/0137634 A1   Jun. 29, 2006

(30) Foreign Application Priority Data

Dec. 23, 2004   (EP) .................................. 04425946

(51) Int. Cl.
  *F01L 1/14*   (2006.01)
(52) U.S. Cl. ............... 123/90.55; 123/90.12; 123/90.13; 123/90.48
(58) Field of Classification Search ............ 123/90.11, 123/90.12, 90.13, 90.16, 90.17, 90.27, 90.39, 123/90.44, 90.45, 90.48, 90.52, 90.55; 251/129.01, 251/129.15
See application file for complete search history.

(56) References Cited

U.S. PATENT DOCUMENTS

| 4,887,562 | A | 12/1989 | Wakeman |
| 6,237,551 | B1 | 5/2001 | Macor et al. |
| 6,918,364 | B1 * | 7/2005 | Vattaneo et al. ......... 123/90.55 |

FOREIGN PATENT DOCUMENTS

| DE | 36 11 476 | 10/1987 |
| DE | 41 32 500 | 4/1993 |
| DE | 42 06 696 | 9/1993 |
| EP | 0 334 272 | 9/1989 |
| EP | 0 803 642 | 10/1997 |
| EP | 1 243 761 | 9/2002 |
| EP | 1 273 770 | 1/2003 |
| EP | 1 344 900 | 9/2003 |

* cited by examiner

Primary Examiner—Ching Chang
(74) Attorney, Agent, or Firm—Nixon & Vanderhye P.C.

(57) ABSTRACT

In an internal combustion engine with variable actuation valves, each variable actuation valve is actuated by an actuator assembly including an actuating piston slidably mounted in a guide bushing. Between the actuating piston and the stem of the respective valve is interposed an auxiliary hydraulic tappet positioned outside the guide bushing of the actuating piston, so that said bushing can be dimensioned with a relatively small diameter, regardless of the outer diameter of the auxiliary hydraulic tappet. The intake valves of a same cylinder are actuated by a single cam, by means of a single pumping piston and by means of a single pressure chamber controlled by a single solenoid valve.

6 Claims, 10 Drawing Sheets

INTERNAL COMBUSTION ENGINE WITH VALVES WITH VARIABLE ACTUATION WHICH ARE DRIVEN BY A SINGLE PUMPING PISTON AND CONTROLLED BY A SINGLE SOLENOID VALVE FOR EACH ENGINE CYLINDER

BACKGROUND OF THE INVENTION

The present invention relates to internal combustion engines with multiple cylinders, of the type comprising:
- at least one intake valve and at least one exhaust valve for each cylinder, each provided with respective return spring means which bias the valve towards a closed position, to control respective intake and exhaust conduits,
- at least one camshaft, to actuate the intake and exhaust valves of the engine cylinders by means of respective tappets,
- in which each intake valve has variable actuation, being actuated by the respective tappet, against the action of the aforesaid return spring means, by the interposition of hydraulic means including a pressurised fluid chamber, into which projects a pumping piston connected to the tappet of the intake valve,
- said pressurised fluid chamber being able to be connected by means of a solenoid valve with an exhaust channel, in order to uncouple the variable actuation valve from the respective tappet and cause the rapid closure of the valve by effect of the respective return spring means,
- electronic control means for controlling each solenoid valve in such a way as to vary the time and travel of opening of the variable actuation valves as a function of one or more operative parameters of the engine,
- in which the aforesaid hydraulic means further comprise an actuator unit for each variable actuation valve, including an actuating piston slidably mounted in guide bushing,
- said actuating piston facing a variable volume chamber communicating with the pressurised fluid chamber both through first communication means controlled by a check valve which allows only the passage of the fluid from the pressurised fluid chamber to the variable volume chamber, and through second communication means which allow the passage between the two chambers in both directions,
- in which said hydraulic means further comprise hydraulic braking means able to cause a narrowing of said second communication means in the final phase of closure of the engine valve,
- in which between the actuating piston of each variable actuation valve and the stem of the valve is interposed an auxiliary hydraulic tappet,
- in which said auxiliary hydraulic tappet comprises:
- a first bushing having an end wall in contact with one end of the stem of the variable actuation valve,
- a second bushing slidably mounted within said first bushing and having one end in contact with a corresponding end of said actuating piston,
- a first chamber defined between said bushing and said actuating piston, which is in communication with a passage for feeding the pressurised fluid to said first chamber,
- a second chamber defined between said first bushing and said second bushing, and
- a non return valve which controls a passage in a wall of said second bushing to allow the passage of fluid only from said first chamber to said second chamber of said auxiliary hydraulic tappet.

SUMMARY OF THE INVENTION

An engine of the type specified above is described for example in the European patent application EP 1 344 900 A2 by the same Applicant.

In engines of this kind, it is important that the closing motion of each valve, determined by the spring means associated with the valve at the time in which the pressurised chamber of the actuating system is discharged, be as fast as possible, to be braked in the final phase of the travel of the valve by the aforesaid hydraulic braking means. This requirement is particularly important when the engine is started at low temperature. However, there are limits to the possibility of making the closing phase of the valve substantially instantaneous, which derive in particular from the mass of the moving members, from the load of the spring means which return the valve to the closed position and from the viscosity of the fluid (the engine lubricating oil) used in the hydraulic system. To increase the closing speed of the valve, it would in particular be advantageous to minimise the diameter of the aforesaid variable volume chamber which is defined by the actuating piston of the valve within the related guide bushing, since said chamber must be emptied of oil during the return movement of the actuating piston caused by the closing of the valve. However, in known solutions, here too there is a limit to the possibility of reducing said diameter, since the inner diameter of the guide bushing of the actuating piston must be sufficient to house the aforesaid auxiliary hydraulic tappet which is interposed between the actuating piston and the stem of the valve. If a tappet of any conventional type available on the market is to be used, the diameter of said tappet cannot be reduced beyond a certain limit.

To eliminate or at least reduce said drawbacks, the Applicant has already proposed in its European patent application EP 04 425 683.2 (still secret as of the filing date of the present application) an engine of the type indicated at the start of the present description, characterised in that said first bushing of the auxiliary hydraulic tappet is mounted outside the guide bushing of the actuating piston.

Thanks to said characteristic, in the engine according to the prior proposal the dimensioning of the inner diameter of the guide bushing of the actuating piston of the valve becomes completely independent of the outer dimension of the aforesaid auxiliary hydraulic tappet. It is thus possible, in particular, to adopt a guide bushing of the actuating piston with a smaller inner diameter than the outer diameter of said auxiliary hydraulic tappet. Therefore, it is possible considerably to reduce the diameter of said variable volume chamber with respect to known solutions, with consequent possibility of greatly accelerating the valve closing motion.

The object of the present invention is further to improve the prior proposal.

To achieve said object, the present invention relates to an engine of the type indicated at the start of the present description, characterised in that said first bushing of each auxiliary hydraulic tappet is mounted outside the guide bushing of the actuating piston, and in that for each cylinder of the engine are provided at least two variable actuation valves, preferably at least two intake valves, which are controlled by a single cam by means of a single pumping piston and by means of a single pressure chamber, controlled by a single solenoid valve and communicating hydraulically with all variable volume chambers of the actuator units of said at least two valves.

The Applicant has discovered that the disposition of the auxiliary hydraulic tappets outside the guide bushings of the respective actuating pistons results in the further advantage of making it concretely possible to provide a single pumping piston and a single solenoid valve to actuate multiple valves for each cylinder. This last characteristic is advantageous in itself from the viewpoint of the simplicity and of the low fabrication cost, in addition to the reduction of the dimensions, relative to the solution that comprises one pumping piston and one solenoid valve for each valve of the engine. However, an efficient and reliable operation of a system having a single pressure chamber communicating hydraulically with multiple valve actuator units is possible only if the volumes of the hydraulic chambers are kept extremely small, which in fact, as has been seen, can be achieved effectively thanks to the adoption of the characteristic in accordance with the prior proposal. The provision of the auxiliary hydraulic tappets outside the guide bushings of the respective actuator pistons allows to reduce the inner diameter of said bushings by the necessary extent, with the consequent reduction of the hydraulic chambers defined within them. The disposition of the auxiliary hydraulic tappets outside the guide bushings of the respective actuating pistons enables to reduce by the necessary extent the inner diameter of said bushings, with the consequent reduction of the hydraulic chambers defined within them.

An additional important advantage of the invention resides in the fact that, thanks to the ability to reduce the diameter of the actuator pistons of the valves, the volume of oil present in the chamber of each actuator unit is minimised, which allows to achieve the goal of making nearly instantaneous, and anyway very fast, the closure of the engine valves when the pressure chamber is discharged by means of the respective solenoid valve, which constitutes an essential element for the efficiency of the system.

BRIEF DESCRIPTION OF THE DRAWINGS

The invention shall now be described with reference to the accompanying drawings, provided purely by way of non limiting example, in which.

DETAILED DESCRIPTION OF THE INVENTION

Figure 1:
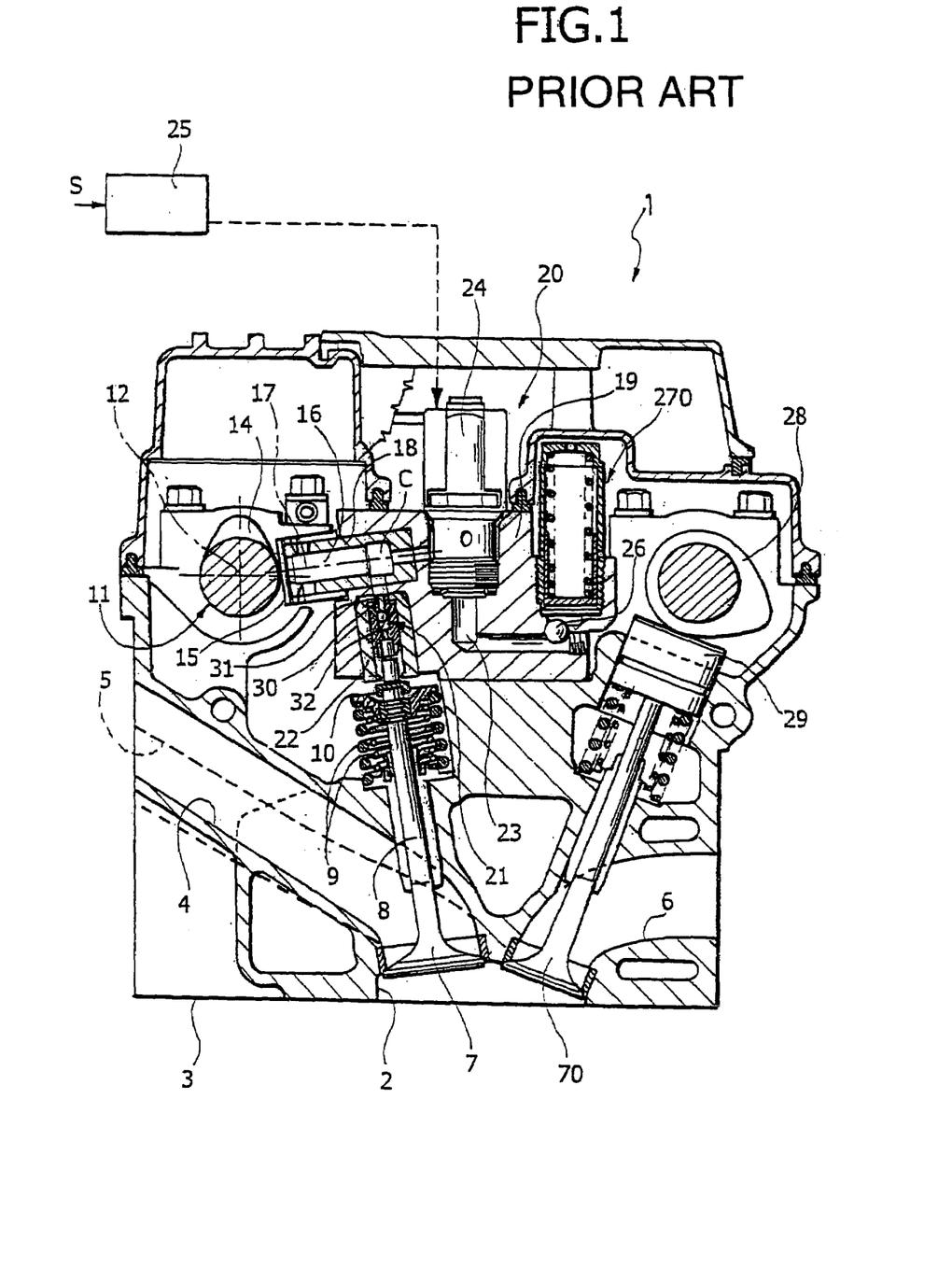
FIG. 1 is a section view of a prior art engine, of the type described for example in European Patent EP 0 803 642 B1 by the same Applicant, which is shown herein to illustrate the fundamental principles of a variable actuation system of the valves.

With reference to FIG. 1, the internal combustion engine described in the prior European patent application EP-A-0 803 642 by the same Applicant is a multi-cylinder engine, for instance an engine with four cylinders in line, comprising a cylinder head 1. The head 1 comprises, for each cylinder, a cavity 2 formed in the base surface 3 of the head 1, defining the combustion chamber, into which end two intake conduits 4, 5 and two exhaust conduits 6. The communication of the two intake conduits 4, 5 with the combustion chamber 2 is controlled by two intake valves 7, of the traditional mushroom type, each comprising a stem 8 slidably mounted in the body of the head 1. Each valve 7 is returned towards the closed position by springs 9 interposed between an inner surface of the head 1 and an end cup 10 of the valve. The opening of the intake valves 7 is controlled, in the manner described below, by a camshaft 11 rotatably mounted around an axis 12 within supports of the head 1, and comprising a plurality of cams 14 for actuating the valves.

Each cam 14 which controls an intake valve 7 co-operates with the washer 15 of a tappet 16 slidably mounted along an axis 17 which, in case of the example illustrated in the aforementioned prior document, was directed substantially at 90° relative to the axis of the valve 7. The tappet 16 is slidably mounted within a bushing 18 borne by a body 19 of a pre-assembled set 20 incorporating all the electrical and hydraulic devices associated to the actuation of the intake valves, as described in detailed below. The tappet 16 is able to transmit a bias to the stem 8 of the valve 7, in such a way as to cause the opening thereof against the action of the spring means 9, by means of pressurised fluid (typically oil from the engine lubrication loop) present in a pressure chamber C, and a piston 21 mounted slidably in a cylindrical body constituted by a bushing 22 which is also borne by the body 19 of the subgroup 20. In the known solution shown in FIG. 1, the pressurised fluid chamber C associated to each intake valve 7 can be placed in communication with the exhaust channel 23 by means of a solenoid valve 24. The solenoid valve 24, which can be of any known type, suited to the function illustrated herein, is controlled by electronic control means, schematically designated by the number 25, according to signals S indicative of engine operating parameters, such as the position of the accelerator pedal and the number of engine revolutions per minute. When the solenoid valve 24 is opened, the chamber C comes in communication with the channel 23, so the pressurised fluid present in the chamber C flows into said channel and an uncoupling is obtained of the cam 14 and of the respective tappet 16 from the intake valve 7, which then rapidly returns to its closed position under the action of the return spring 9. By controlling communication between the chamber C and the outlet channel 23, it is therefore possible to vary at will the time and opening stroke of each intake valve 7.

The outlet channels 23 of the various solenoid valves 24 all end in a same longitudinal channel 26 communicating with pressure accumulators 27, only one whereof is visible in FIG. 1. All the tappets 16 with the associated bushings 18, the pistons 21 with the associated bushings 22, the solenoid valves 24 and the related channels 23, 26 are borne and formed in the aforesaid body 19 of the pre-assembled set 20, to the advantage of the rapidity and ease of assembly of the engine.

The exhaust valves 70 associated to each cylinder are controlled, in the embodiment illustrated in FIG. 1, in traditional fashion, by a respective camshaft 28, by means of respective tappets 29, although in principle, both in the case of the prior document mentioned above, and in the case of the present invention, an application of the variable actuation system to command the exhaust valves is not excluded.

Also with reference to FIG. 1, the variable volume chamber defined inside the bushing 22 by the piston 21 (which in FIG. 1 is shown in its minimum volume condition, the piston 21 being in its upper top stroke end position) communicates with the pressurised fluid chamber C through an opening 30 obtained in an end wall of the bushing 22. Said opening 30 is engaged by an end nose 31 of the piston 21 in such a way as to obtain a hydraulic braking of the motion of the valve 7 in the closing phase, when the valve is near the closed position, since the oil present in the variable volume chamber is forced to flow into the pressurised fluid chamber C passing through the play existing between the end nose 31 and the wall of the opening 30 engaged thereby. In addition to the communication constituted by the opening 30, the pressurised fluid chamber C and the variable volume chamber of the piston 21 communicate with each other by means of internal passages formed in the body of the piston 21 and controlled by a check valve 32 which allows the passage of fluid only from the pressurised chamber C to the variable volume chamber of the piston.

During the normal operation of the prior art engine illustrated in FIG. 1, when the solenoid valve 24 excludes the communication of the pressurised fluid chamber C with the exhaust channel 23, the oil present in this chamber transmits the motion of the tappet 16 imparted by the cam 14 to the piston 21 that commands the opening of the valve 7. In the initial phase of the opening movement of the valve, the fluid coming from the chamber C reaches the variable volume chamber of the piston 21 passing through an axial hole 30 drilled in the nose, the check valve 32 and additional passages which place in communication the inner cavity of the piston 21, which has tubular shape, with the variable volume chamber. After a first displacement of the piston 21, the nose 31 comes out of the opening 30, so the fluid coming from the chamber C can pass directly into the variable volume chamber through the opening 30, which is now free. In the inverse movement of closure of the valve, as stated, during the final phase the nose 31 enters into the opening 30 causing the hydraulic braking of the valve, to prevent any impacts of the body of the valve against its seat.

Figure 2:
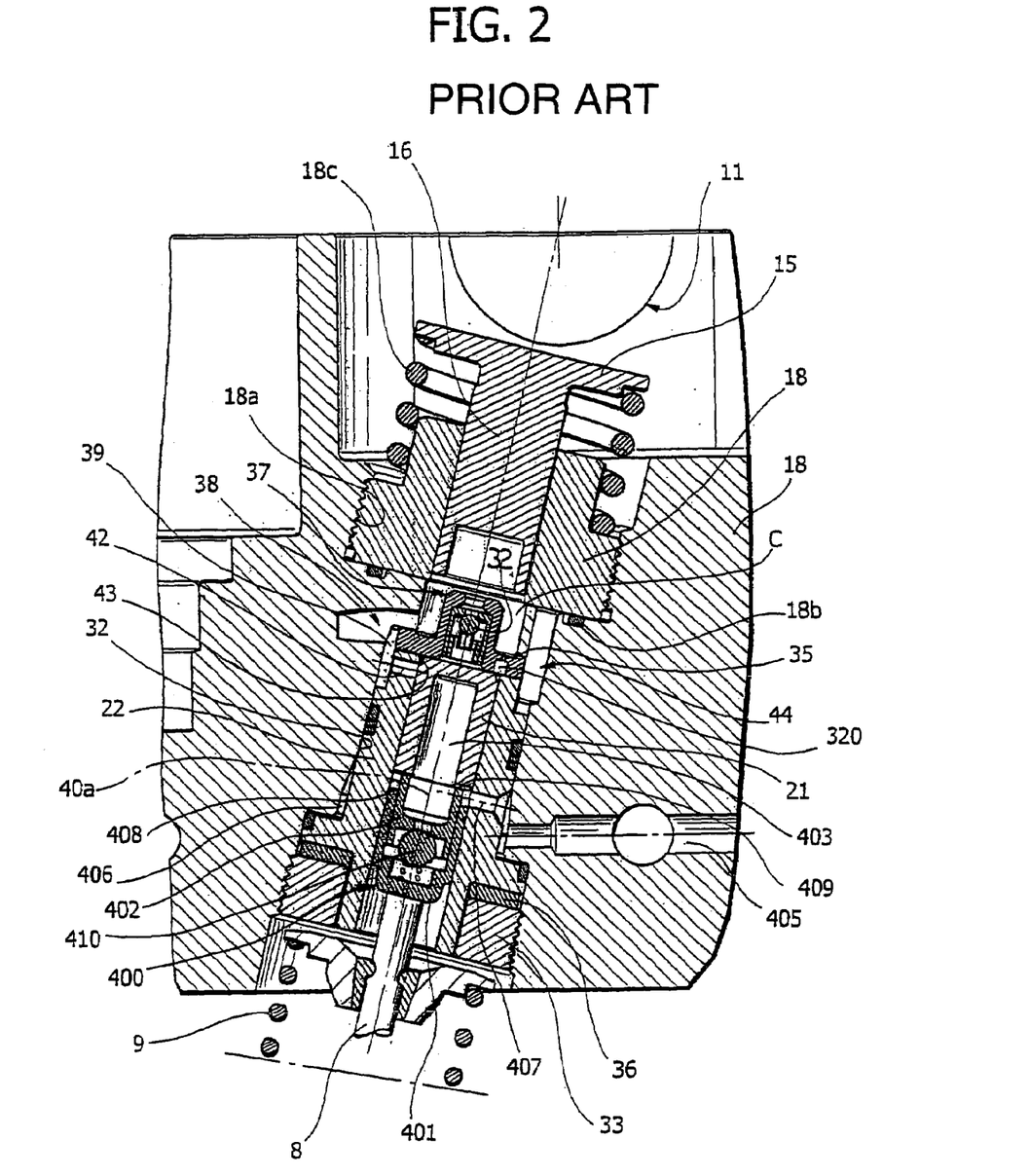
FIG. 2 is a section view in enlarged scale of an auxiliary hydraulic tappet associated with an intake valve of an engine of a type similar to that of FIG. 1, as previously proposed in the European Patent application EP 1 344 900 by the Applicant.

FIG. 2 shows the device described above in the modified form which was proposed in the previous European Patent application EP 0 1 344 900 by the same Applicant.

In FIG. 2, the parts in common with FIG. 1 are designated by the same reference number.

A first evident difference of the device of FIG. 2 with respect to that of FIG. 1 is that in the case of FIG. 2, the tappet 16, the piston 21 and the stem 8 of the valve are mutually aligned along an axis 40. This difference does not fall within the scope of the invention, as it is already contemplated in the prior art. Similarly, the invention would also apply to the case in which the axes of the tappet 16 and of the stem 8 were to form an angle between them.

Similarly to the solution of FIG. 1, the tappet 16, with the related washer 15 which co-operates with the cam of the camshaft 11 is slidably mounted in a bushing 18. In the case of FIG. 2, the bushing 18 is screwed into a threaded cylindrical seat 18a obtained in the metal body 19 of the pre-assembled set 20. A sealing gasket 18b is interposed between the bottom wall of the bushing 18 and the bottom wall of the seat 18a. A spring 18c returns the washer 15 in contact with the cam of the camshaft 11.

In the case of FIG. 2 also, as in FIG. 1, the piston 21 is slidably in a bushing 22 which is received in a cylindrical cavity 32 obtained in the metallic body 19, with the interposition of sealing gaskets. The bushing 22 is held in the mounted condition by a threaded ring nut 33 which is screwed in a threaded end portion of the cavity 32 and which presses the body of the bushing 22 against an abutment surface 35 of the cavity 32. Between the locking ring nut 33 and the flange 34 is interposed a Belleville washer 36 to assure a controlled axial load to compensate for the differential thermal expansions between the different materials constituting the body 19 and the bushing 22.

The main difference of the prior art solution shown in FIG. 2 and the one, also known, of FIG. 1 is that in this case the check valve 32 which allows the passage of pressurised fluid from the chamber C to the chamber of the piston 21 is not borne by the piston 21 but rather by a separate element 37 which is fixed relative to the body 19 and it superiorly closes the cavity of the bushing 22 within which is slidably mounted the piston 21. Moreover, the piston 21 does not have the complicated conformation of FIG. 1, with the end nose 31, but it is shaped as a simple cup-like cylindrical element, with a bottom wall facing the variable volume chamber which receives pressurised fluid from the chamber C through the check valve 32.

The element 37 is constituted by an annular plate which is locked in position between the abutment surface 35 and the end surface of the bushing 22, as a result of the tightening of the locking ring nut 33. The annular plate has a central cylindrical projection which serves as a container for the check valve 32 and which has an upper central hole for the passage of the fluid. In the case of FIG. 2 as well, the chamber C and the variable volume chamber delimited by the piston 21 communicate with each other, as well as through the check valve 32, through an additional passage, constituted by a lateral cavity 38 obtained in the body 19, a peripheral cavity 39 defined by a flattening of the outer surface of the bushing 22, and by an opening (not showing in FIG. 2) of greater size and a hole 42 of smaller size obtained radially in the wall of the bushing 22. These openings are shaped and mutually arranged in such a way as to achieve operation with hydraulic brake in the final closing phase of the valve, for when the piston 21 has obstructed the opening of greater size, the hole 42 remains free, which intercepts a peripheral end throat 43 defined by a circumferential end groove of the piston 21. To assure that the aforesaid two openings correctly intercept the fixed passage 38, the bushing 34 must be mounted in a precise angular position, which is assured by an axial pin 44. This solution is preferred with respect to the arrangement of a circumferential throat on the outer surface of the bushing 22, for this would entail an increase in the oil volumes in play, with consequent drawbacks in operation. A calibrated hole 320 is also provided in the element 37, which directly places the annular chamber defined by the throat 43 in communication with the chamber C. Said hole 320 assures correct operation at low temperature, when the fluid (engine lubrication oil) is very viscous.

In operation, when the valve needs to be opened, pressurised oil, bias by the tappet 16, flows from the chamber C to the chamber of the piston 21 through the check valve 32. As soon as the piston 21 has moved away from its upper end stop position, the oil can then flow directly into the variable volume chamber through the passage 38 and the two aforesaid openings (the larger one and the smaller one 42), bypassing the check valve 32. In the return movement, when the valve is near its closed position, the piston 21 intercepts first the large opening and then the opening 42 determining the hydraulic braking. A calibrated hole can also be provided in the wall of the element 37 to reduce the braking effect at low temperatures, when the viscosity of the oil would cause excessive slowing in the movement of the valve.

As is readily apparent, the main different with respect to the solution shown in FIG. 1 is that the operations for fabricating the piston 21 are much simpler, since said piston has a far less complicated conformation than the one contemplated in the prior art. The solution according to the invention also allows to reduce the oil volume in the chamber associated with the piston 21, which allows to obtain a regular closing movement of the valve, without hydraulic bounces, a reduction in the time required for closing, a regular operation of the hydraulic tappet, without pumping, a reduction in impulsive force in the springs of the engine valves and reduction in hydraulic noise.

An additional characteristic of the prior art solution shown in FIG. 2 is the provision of a hydraulic tappet 400 between the piston 21 and the stem 8 of the valve. The tappet 400 comprises two concentric slidable bushings 401, 402. The inner bushing 402 defines with the inner cavity of the piston 21 a chamber 403 which is fed a pressurised fluid through passages 405, 406 in the body 19, a hole 407 in the bushing 22 and passages 408, 409 in the bushing 402 and in the piston 21.

A check valve 410 controls a central hole in a frontal wall borne by the bushing 402.

Figure 3:
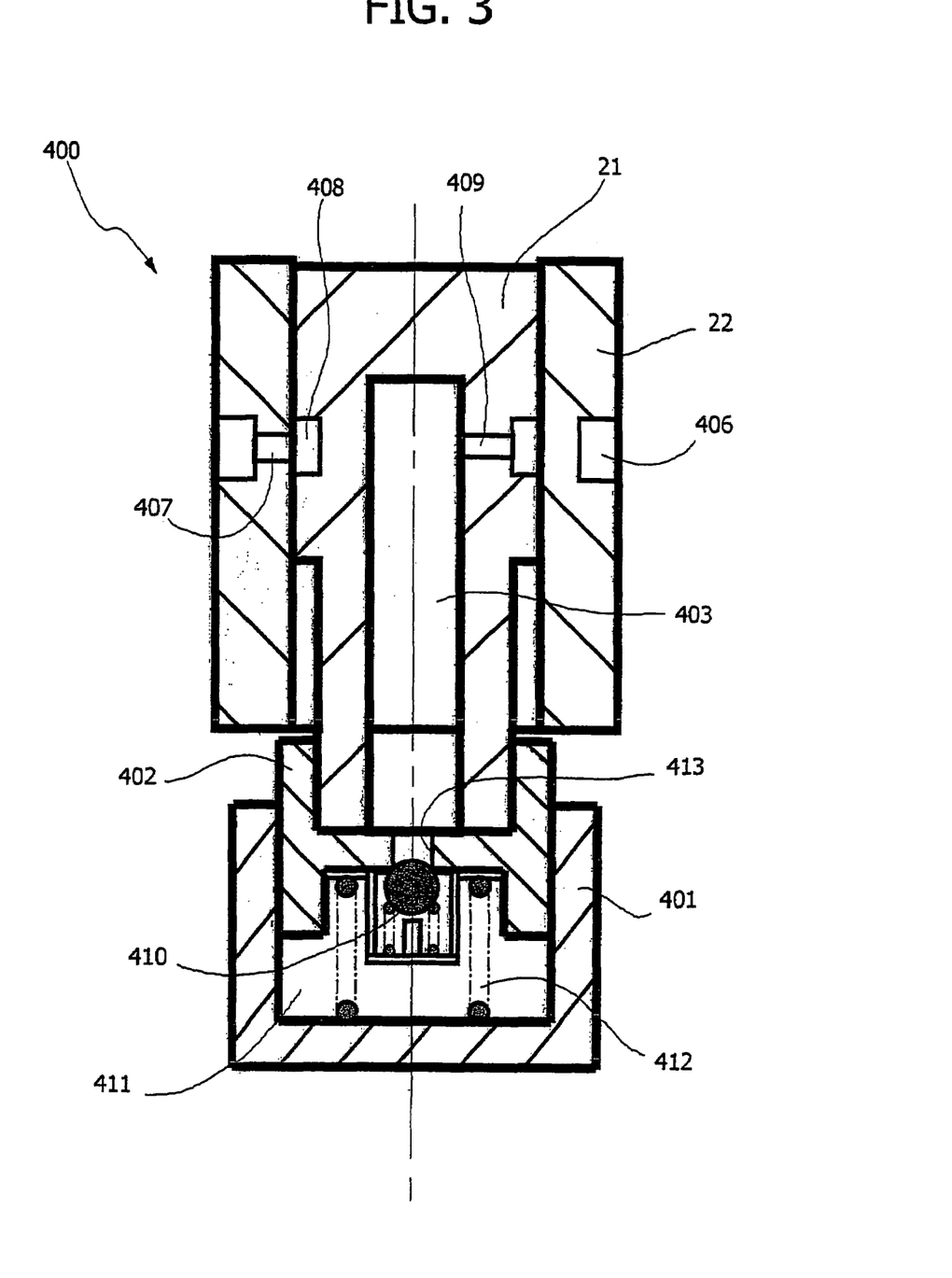
FIG. 3 is a schematic section view of an auxiliary hydraulic tappet in an engine according to the present invention.

In regard to the present invention, FIG. 3 shows a schematic section view of the end wall of the actuating piston 21 of a variable actuation valve and the related guide bushing 22, as well as the auxiliary hydraulic tappet 400 associated with the actuator assembly constituted by the piston 21 and by the bushing 22. As FIG. 3 clearly shows, the main difference with respect to the prior art solution illustrated in FIG. 2 is that in this case the auxiliary hydraulic tappet 400 is completely positioned outside the actuator assembly of the variable actuation valve. More specifically, the first bushing 401 of the auxiliary hydraulic tappet 400 is not positioned inside the guide bushing 22. Thanks to this characteristic, the dimensioning of the guide bushing 22 is completely independent of the dimensions of the auxiliary hydraulic tappet 400. This is an advantage, since, if a hydraulic tappet of any conventional type available on the market is to be used, the outer diameter of said tappet cannot be reduced beyond a certain limit. On the other hand, there is an advantage, as discussed at the start of the present description, in reducing the diameter of the guide bushing 22, since said reduction in diameter entails a reduction in the quantity of oil which must flow out of the variable volume chamber defined inside the guide bushing 22 from the upper end of the piston 21 when the engine valve has to close. It is thereby possible to obtain a substantial reduction in the closing time of the valve, with consequent advantages in terms of the efficient operation of the engine, with respect to the prior art solution illustrated in FIG. 2.

With reference again to FIG. 3, the inner chamber 403 of the hydraulic tappet is fed with oil from the engine lubrication loop in similar fashion to the one illustrated in FIG. 2. The oil coming from a feeding channel 405 (2) reaches a circumferential chamber 406 (3) defined by an outer peripheral throat of the guide bushing 22. From said circumferential chamber 406, the oil flows, through a radial hole 407 obtained in the wall of the guide bushing 22 into a peripheral chamber 408 defined by a circumferential throat of the outer surface of the piston 21. Thence the oil passes into the chamber 403 through a radial hole 409 obtained in the wall of the piston 21. The communication between the chamber 403 defined between the piston 21 and the bushing 402, and the chamber 411 defined between the two bushings 401, 402, is controlled by the check valve 410, subjected to the action of the return spring 412. The operation of the actuator assembly 21, 211 and of the auxiliary hydraulic tappet 400 is wholly similar to the one described above with reference to prior art solutions.

In the case of the solution illustrated in FIG. 3, both bushings 401, 402 constituting the auxiliary hydraulic tappet 400 are positioned outside the guide bushing 22 of the actuator piston 21.

Figure 4:
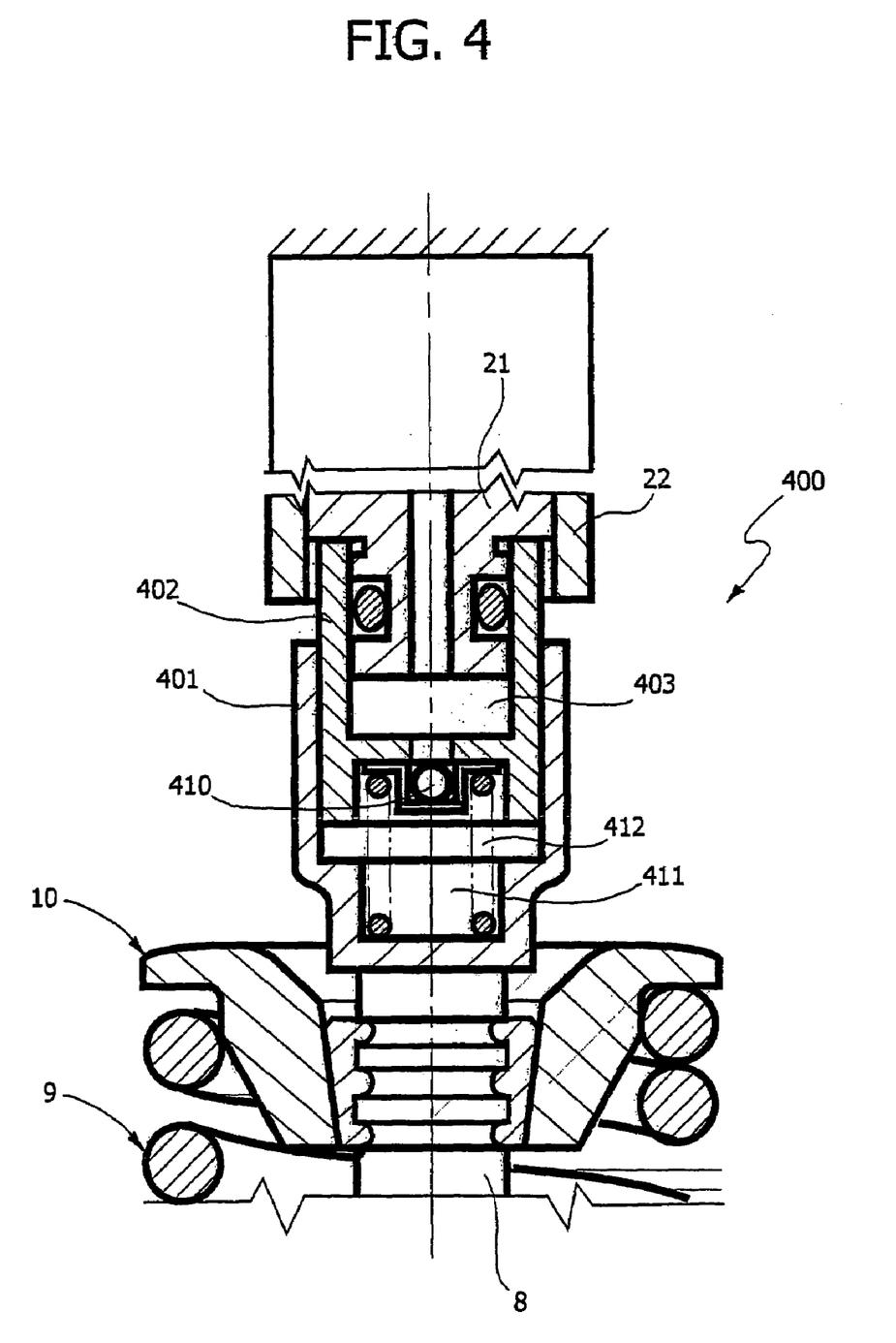
FIG. 4 is a similar view to FIG. 3, showing an embodiment example.

FIG. 4 shows a variant, wholly similar, in principle, to the solution of FIG. 3, which differs therefrom in that only the bushing 401 of the auxiliary hydraulic tappet 400 is positioned outside the guide bushing 22, whilst the bushing 402 is mounted within it. Otherwise, the solution shown in FIG. 4 differs from the solution shown only schematically in FIG. 3 solely in some constructive details. FIG. 4 also partially shows the upper end of the stem 8 of the valve with the respective return valve 9 and the respective end element 10 for bearing the spring 9.

Figure 5:
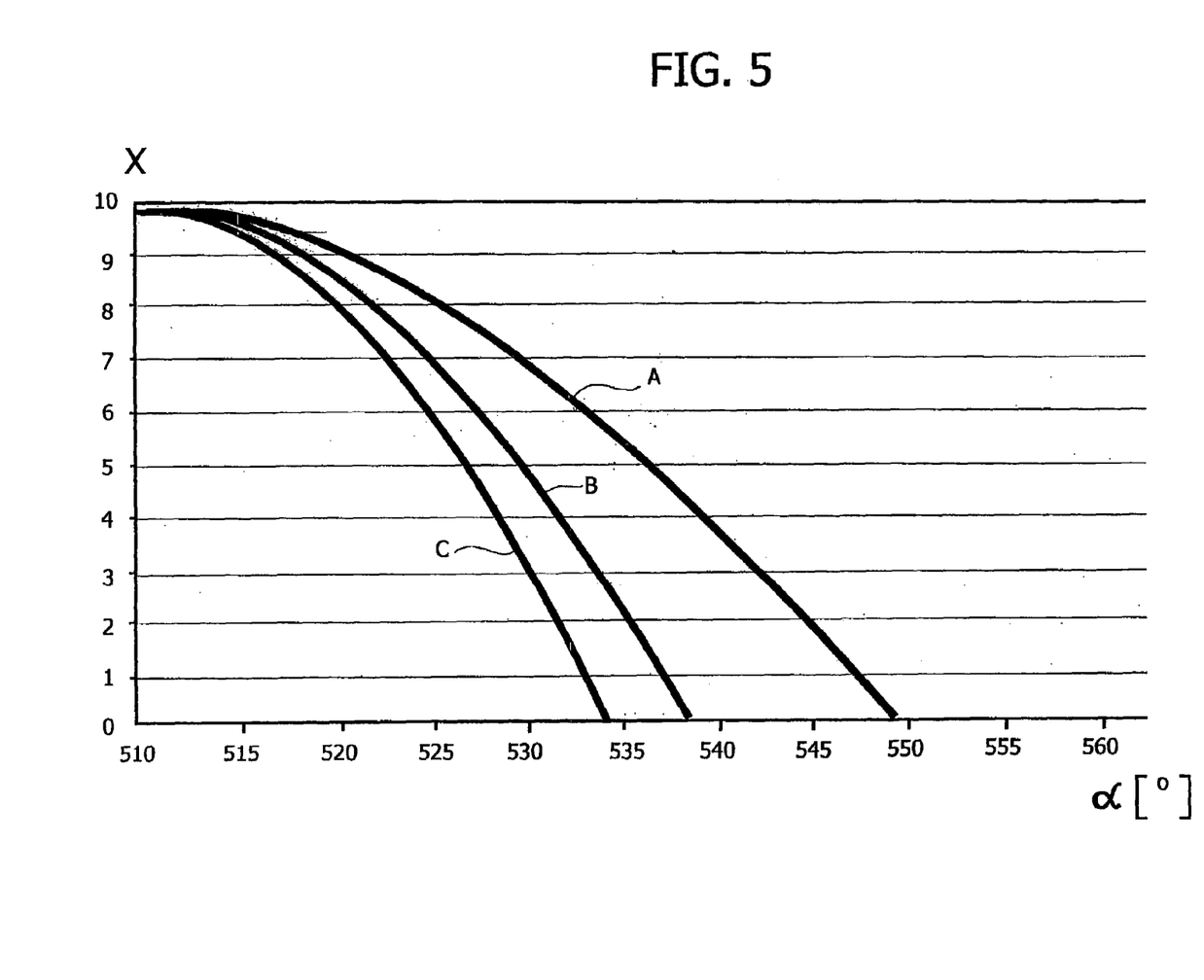
FIG. 5 shows a diagram that illustrates the advantages of the invention.

FIG. 5 is a diagram that shows the advantages of the invention. It illustrates the displacement X of the engine valve in the closing phase, as the angle of the drive shaft changes in three different situations. Diagrams A and B refer to the case in which, all other dimensions being equal, the inner diameter of the guide bushing 22 of the piston is respectively 11 mm (diagram A) and 9 mm (diagram B). The solution A substantially corresponds to the one illustrated in FIG. 2, while the solution B becomes possible thanks to the present invention, because of the positioning of the auxiliary hydraulic tappet 14 outside the valve actuator assembly. As is readily apparent, the angle of rotation of the drive shaft required to obtain the complete closing of the valve is substantially reduced in the case of the present invention.

Naturally, a determining factor influencing the closing speed of the valve is the ratio between the narrow passage area of the solenoid valve (24, FIG. 1) through which the oil present in the chamber of the actuator assembly returns into the low pressure area (23, FIG. 1) and the area of the chamber of the actuator assembly, defined by the upper end of the piston 21 inside the guide bushing 22. The diagram C shows the situation of an ideal actuator, in which the ratio between said areas is equal to 1. Obviously, this solution cannot be achieved in practice, but it is interesting to note that, thanks to the invention, a closing speed of the valve is obtained (diagram B) that is not much lower than the ideal solution represented by diagram C.

Figure 6:
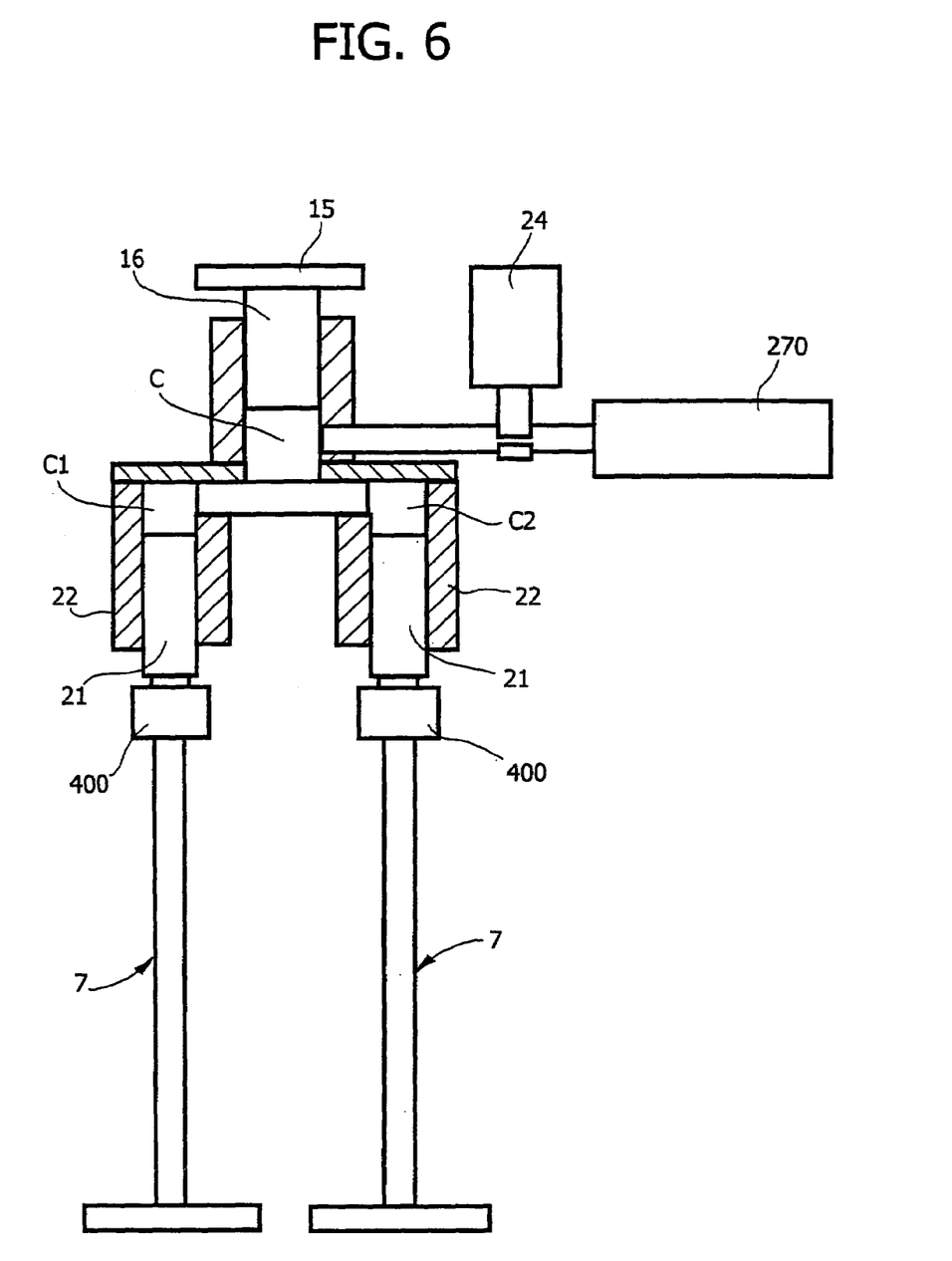
FIG. 6 is a schematic view of a system according to the invention.

FIG. 6 is a schematic view of the system according to the invention. In this figure, the parts in common with those of the previous figures are designated with the same reference number. The figure shows two intake valves 7 associated to a same cylinder of an internal combustion engine, which are controlled by a single pumping piston 16, in turn actuated by a single cam of the engine camshaft (not shown) acting against its washer 15. The figure does not show the return springs 9 (see FIG. 1) which are associated to the valves 7 and tend to return them to the respective closed positions.

As is readily apparent, in the system according to the invention a single pumping piston 16 actuates the two valves 7 by means of a single pressure chamber C, whose communication with the exhaust is controlled by a single solenoid valve 24. This solution thus allows obvious advantages in terms of simplicity and economy of construction and from the viewpoint of bulk reduction.

The sole pressure chamber C is hydraulically in communication with both variable volume chambers C1, C2 which face the pistons 21 that actuate the two valves.

The system according to the invention is able to operate efficiently and reliably especially if the volumes of the hydraulic chambers are relatively small. This possibility is offered by the adoption of hydraulic tappets 400 outside the bushings 22, because by so doing the bushings 22 can have an inner diameter that can be chosen as small as is desired.

It should also be added that the possible differences in displacement of the two valves 7, due to slight differences in the load of the springs 9 associated to them, do not compromise the proper operation of the system, since, due to the hydraulic connection, all other conditions being equal, the identical rise of the two valves in the theoretical case of identical springs is equal to the mean of the two real rises in the case of springs with different loads. The comprehension of this aspect has enabled the Applicant to intuit the practical advantages of the system illustrated herein and the absence of any drawback from the operative viewpoint.

Figure 7:
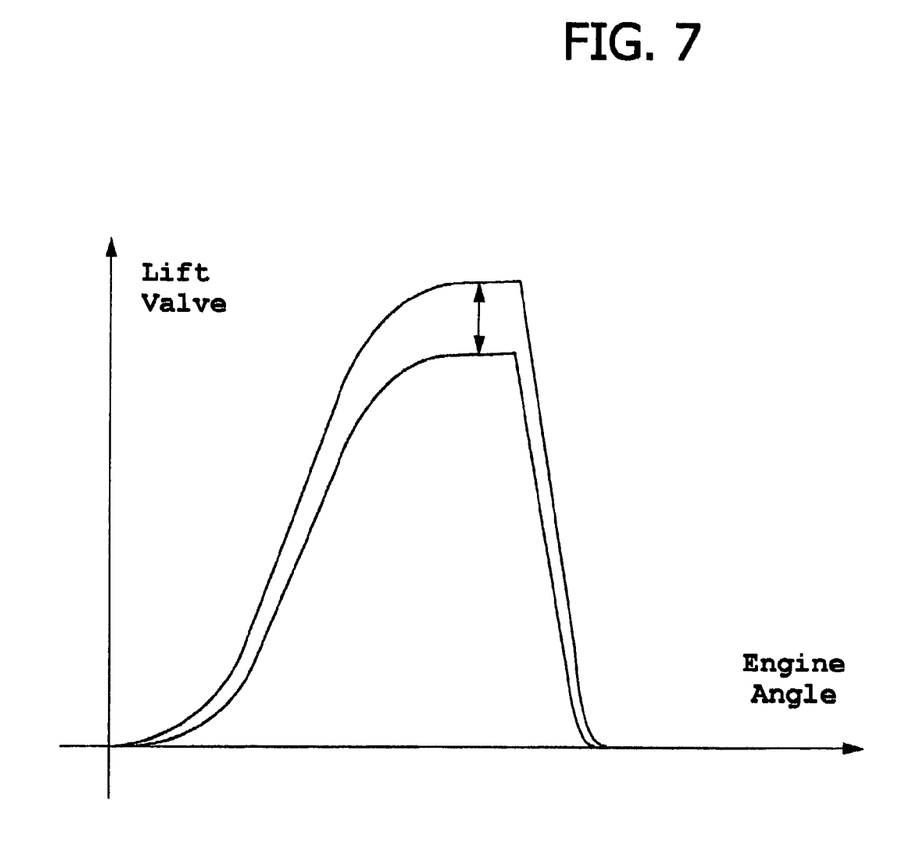
FIGS. 7 and 8 are diagrams which show the advantages of the invention.
Figure 8:
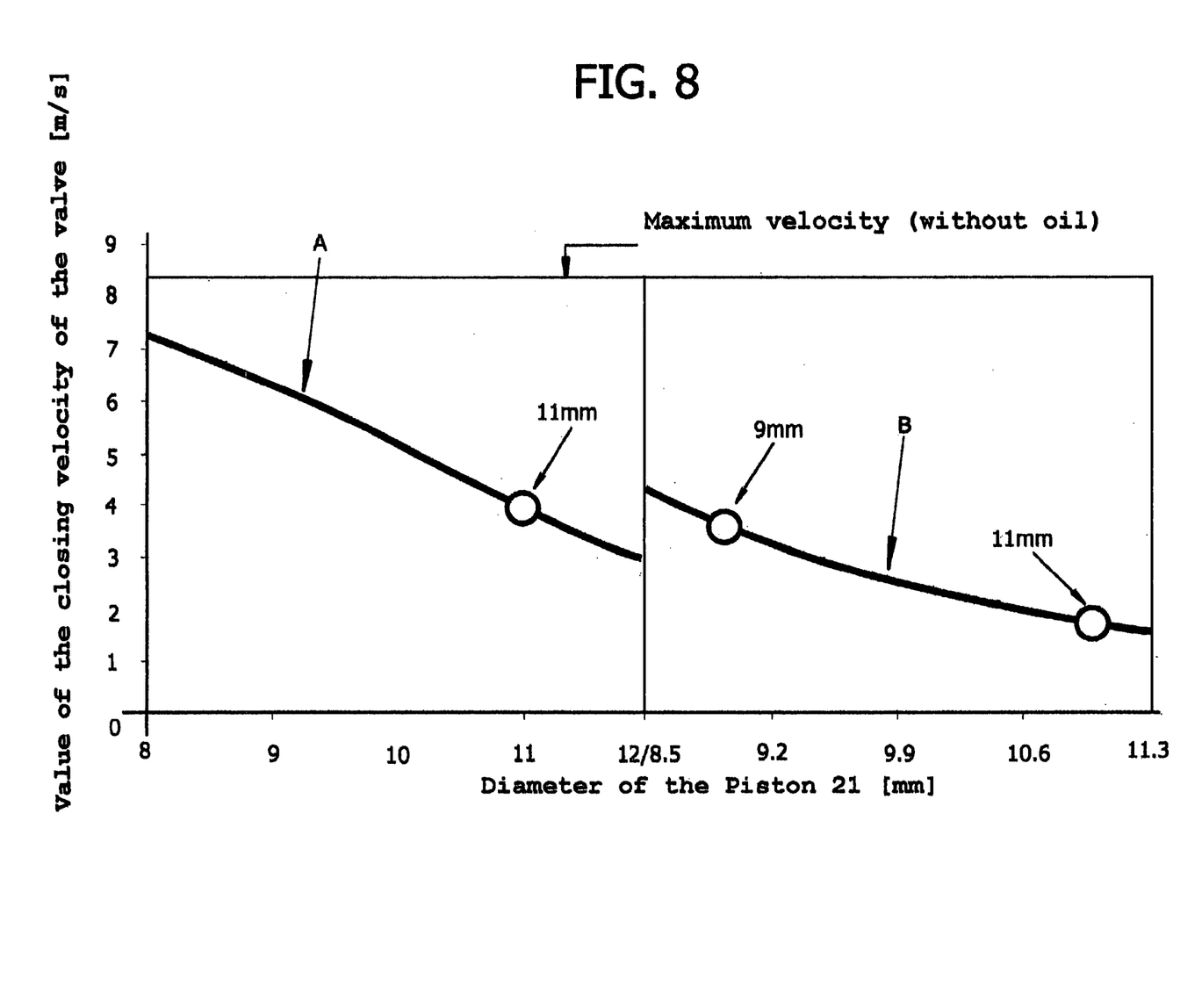

FIG. 7 shows a diagram of the real lifts of the two intake valves associated to each cylinder of the engine according to the invention. These lifts differ from each other in the differences of the load of the respective return springs 9, due to manufacturing tolerances. As is readily apparent, the part of the diagram that describes the closure of the valves corresponds to an extremely small variation of the engine angle. This is allowed by the fact that the diameter of the pistons 21 of the actuator units of the valve can be considerably reduced relative to the measure that would be necessary if the guide bushing 22 of each unit were to house the tappet 400 in its interior. In a concrete case, the adoption of the tappet 400 outside the bushing 22 has allowed to adopt a diameter of only 9 mm for the piston 21, instead of 11 mm (measure which would have been necessary to house a standard tappet). The diagram of FIG. 8 shows a line A which refers to a conventional solution of four-cylinder engine with two intake valves per cylinder and a pumping piston per each valve. The line B refers to the system according to the invention, with a single pumping piston for the two intake valves of each cylinder. Both lines show the value of the closing velocity of the valves, in metres per second, as a function of the diameter of the piston 21. As is readily apparent, in the conventional case (line A) a value of 11 mm of the diameter of the piston 21 corresponds to a closing velocity of the valves in the order of 4 metres per second. In the system according to the invention, the adoption of a single pumping piston would produce a reduction in the aforesaid velocity, but the possibility of adopting a value of 9 mm for the diameter of the piston 21 associated to each valve brings the velocity back to a value that is substantially equal to that of the conventional system. Therefore, the system according to the invention does not entail penalisations with respect to traditional systems and at the same time it achieves a great simplification and great savings in costs and size.

Figure 9:
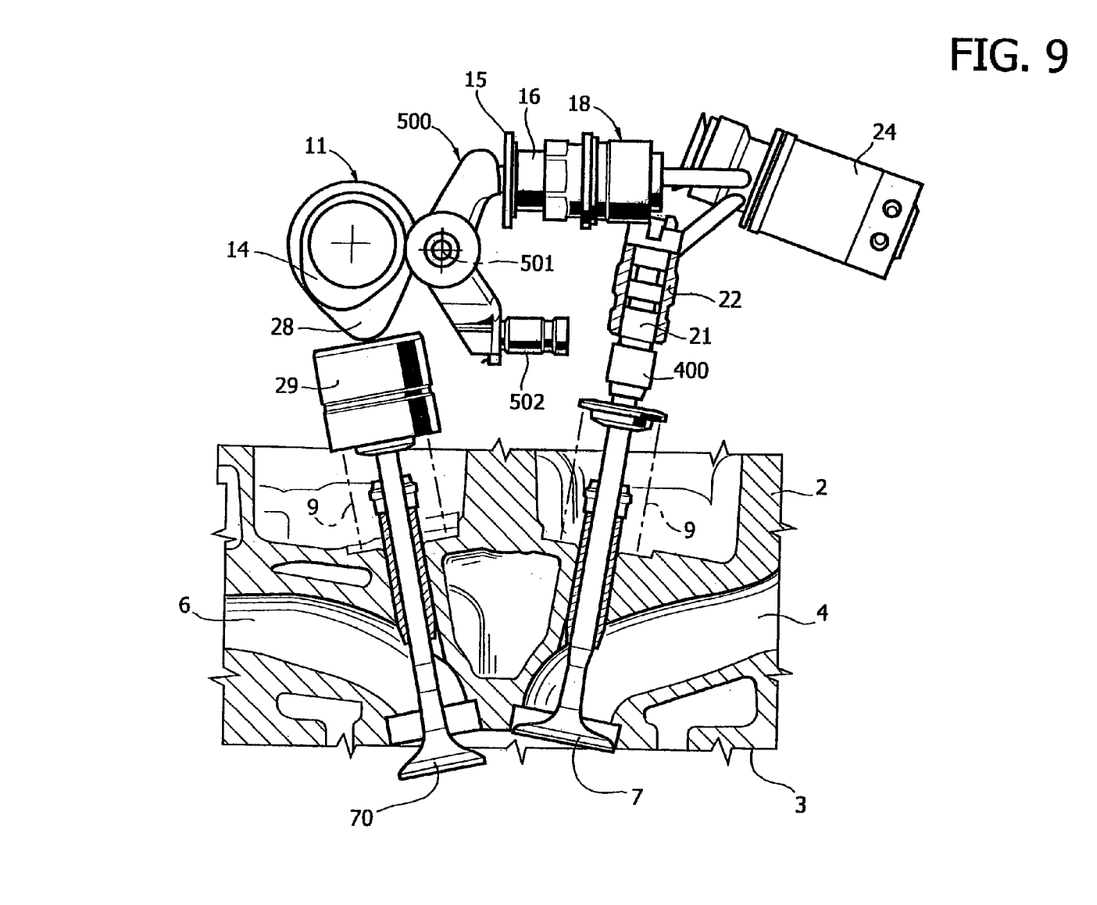
FIGS. 9, 10 illustrate two section views of an embodiment of the system according to the invention.
Figure 10:
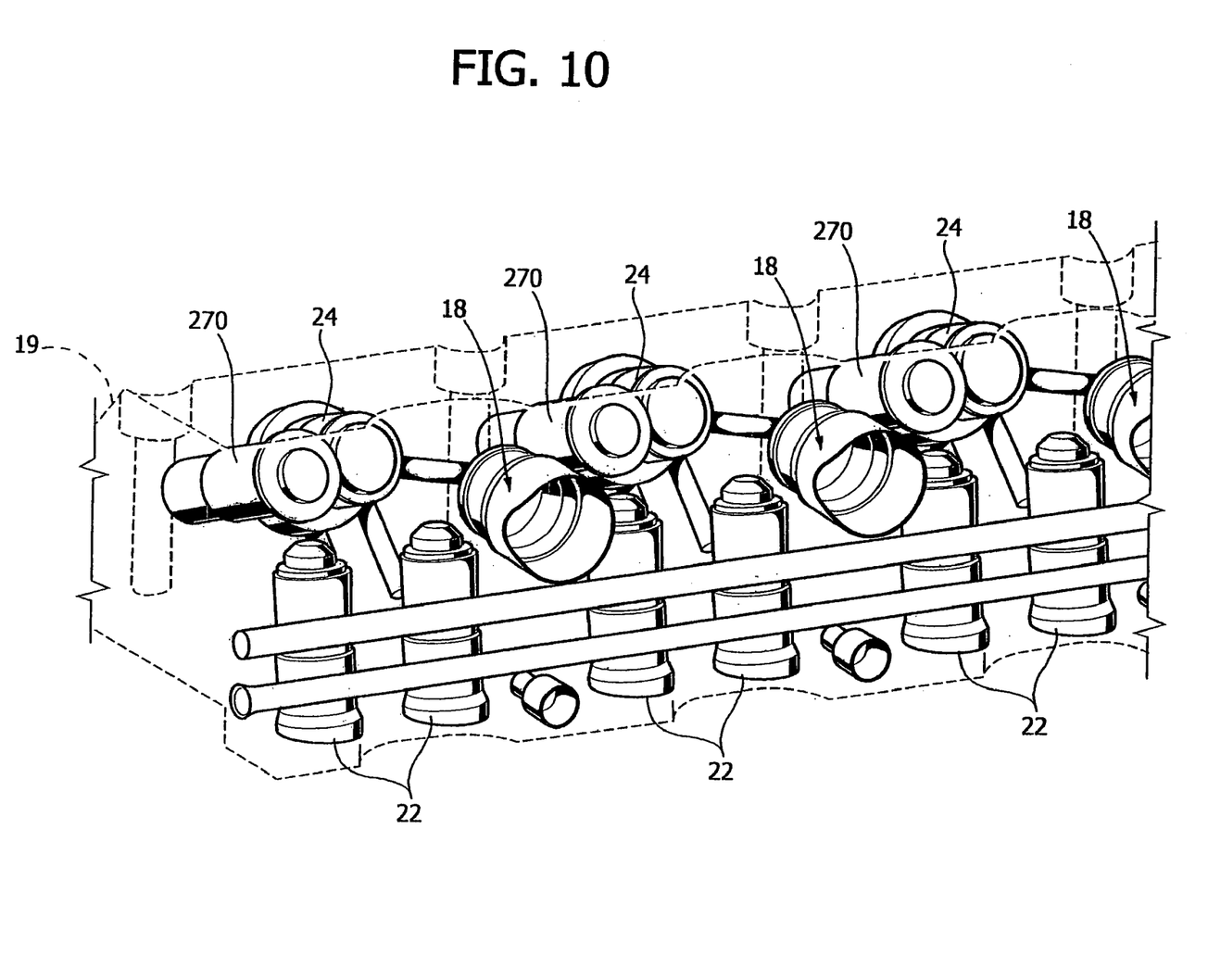

FIGS. 9 and 10 are a simplified section view and a schematic perspective view of the components of the system according to the invention in a practical embodiment. In these figures, too, the parts in common with those of the previous figures are designated with the same reference number. The illustrated example refers to a particularly preferred solution, in which the intake valves 7 and the exhaust valves 70 are actuated by a single camshaft 11, having cams 28 which mechanical actuate the exhaust valves 70 and cams 14 which actuate four pumping pistons 16 associated to the four cylinders of the engine, by means of respective rocker arms 500. Each rocker arm 500 supports at its centre in 501 a rotatable roller for engagement with the respective cam 14, has one end pivotally engaged to the structure 19 by means of a support 502 and the opposite end acting against the washer 15 of the respective pumping piston 16. The upper part of FIG. 9, and FIG. 10, for the sake of clarity, show only the components of the system, without showing the structure 19 in which they are mounted. The arrangement described and illustrated above allows the additional advantage of simplifying the structure of the engine and of containing the size of the system. In the illustrated example, the tappets 29 and the rocker arms 500 co-operate with regions that are angularly offset by about 90° on the camshaft 11. Moreover, each of the four cams 14 which actuate the eight intake valves is axially offset relative to both intake valves of the respective cylinder of the engine. Naturally, without altering the principle of the invention, the construction details and the embodiments may be widely varied relative to what is described and illustrated purely by way of example herein, without thereby departing from the scope of the present invention.

What is claimed is:

1. A multi-cylinder internal combustion engine, comprising:

at least one intake valve and at least one exhaust valve for each cylinder, each provided with respective return spring means which bias the valve towards a closed position, to control respective intake and exhaust conduits, at least one camshaft, to actuate the intake and exhaust valves of the engine cylinders by means of respective tappets, in which at least each intake valve has variable actuation, being actuated by the respective tappet, against the action of the aforesaid return spring means, by the interposition of hydraulic means including a pressurised fluid chamber, into which projects a pumping piston connected to the tappet of the intake valve, said pressurised fluid chamber being able to be connected by means of a solenoid valve with an exhaust channel, in order to uncouple the variable actuation valve from the respective tappet and cause the rapid closure of the valve by effect of the-respective return spring means, electronic control means for controlling each solenoid valve in such a way as to vary the time and travel of opening of the variable actuation valve as a function of one or more operative parameters of the engine, in which the aforesaid hydraulic means further comprise an actuation assembly for each variable actuation valve, including an actuating piston slidably mounted in a guide bushing, said actuating piston facing a variable volume chamber communicating with the pressurised fluid chamber both through first communication means controlled by a check valve which allows only the passage of the fluid from the pressurised fluid chamber to the variable volume chamber, and through second communication means which allow the passage between the two chambers in both directions, in which said hydraulic means further comprise hydraulic braking means able to cause a narrowing of said second communication means in the final phase of closure of the engine valve, in which between the actuating piston of each variable actuation valve and the stem of the valve is interposed an auxiliary hydraulic tappet, in which said auxiliary hydraulic tappet comprises:
a first bushing having an end wall in contact with one end of the stem of the variable actuation valve,
a second bushing slidably mounted within said first bushing and having an end in contact with a corresponding end of said actuating piston,
a first chamber defined between said second bushing and said actuating piston, which is in communication with a passage for feeding the pressurised fluid to said first chamber,
a second chamber defined between said first bushing and said second bushing, and
a check valve which controls a passage in a wall of said second bushing to allow the passage of fluid only from said first chamber to said second chamber of said auxiliary hydraulic tappet,
wherein said first bushing of the auxiliary hydraulic tappet is mounted outside the guide bushing of the actuator piston, and
wherein for each cylinder of the engine are provided at least two variable actuation valves, which are controlled by a single cam by means of a single pumping piston and by means of a single pressure chamber, controlled by a single solenoid valve and communicating hydraulically with the variable volume chambers of the actuator units of said at least two valves.

2. Engine as claimed in claim 1, wherein it comprises a single camshaft having cams which mechanically actuate the exhaust valves of the engine and cams which actuate the engine intake valves by means of said pumping pistons.

3. Engine as claimed in claim 1, wherein the inner diameter of the guide bushing is considerably smaller than the outer diameter of said first bushing of the auxiliary hydraulic tappet.

4. Engine as claimed in claim 1, wherein the second bushing of the auxiliary hydraulic tappet is positioned outside the guide bushing.

5. Engine as claimed in claim 1, wherein the second bushing of the auxiliary hydraulic tappet is positioned inside the guide bushing of the actuating piston.

6. Engine as claimed in claim 5, wherein the actuating piston has one end with reduced diameter positioned inside the aforesaid second bushing of the auxiliary hydraulic tappet.

* * * * *